July 6, 1926.

C. F. GILFORD ET AL 1,591,755

ALIGNING GAUGE

Filed July 2, 1925

Inventor

Charles F. Gilford,
Fred E. Gilford,

By L. N. Gilley

Attorney

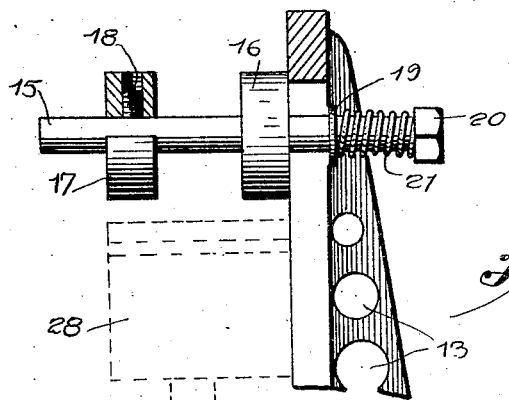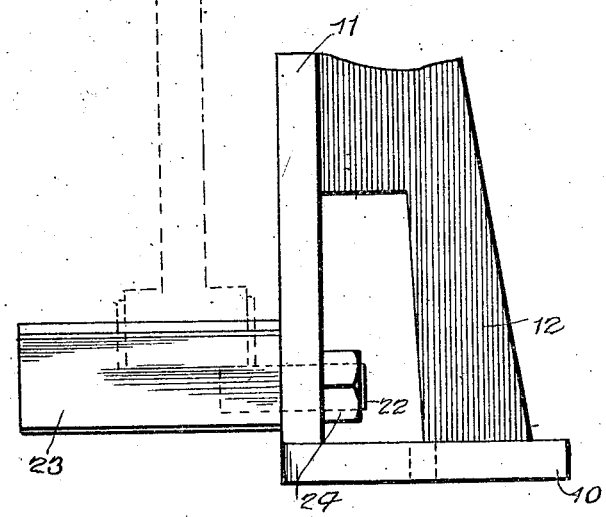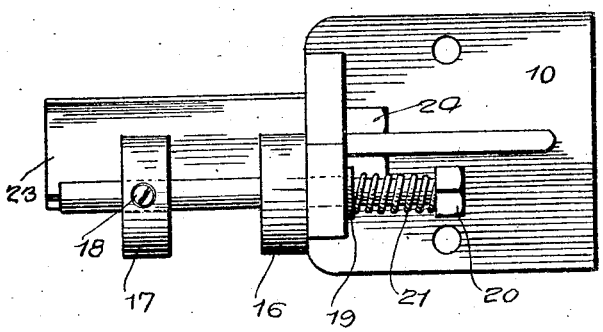

Patented July 6, 1926.                                                          1,591,755

UNITED STATES PATENT OFFICE.

CHARLES F. GILFORD AND FREDERICK E. GILFORD, OF CONCORD, NEW HAMPSHIRE.

ALIGNING GAUGE.

Application filed July 2, 1925. Serial No. 41,181.

This invention relates to gauges, and has special reference to a testing gauge for testing automobile connecting rods.

The principle and most important object of this invention is to provide an improved construction of testing gauge especially adapted for determining the truth of alignment of connecting rods, such as are used in internal combustion engines in their relationship to the pins used in connecting them to the pistons and also for testing the truth of the alignment and squareness of the piston in its relation to the crank shaft end of the connecting rod.

A second object of this invention which is also important is the provision of an improved device of this character in which such testing as above set forth, may be accomplished through a wide range of piston sizes and connecting rod lengths, the invention being so proportioned and constructed as to enable the testing of any of the commercial sizes such as are usually found in automobile engines and other like internal combustion motors.

With the above and other objects in view as will be hereinafter apparent, the invention consists in general of certain novel details of construction and combinations of parts hereinafter more fully described, illustrated in the accompanying drawings and specifically claimed.

In the accompanying drawings like characters of reference indicate like parts in the several views, and:

Fig. 3 is a view similar to Fig. 1, the central part being broken away, and showing the device as used for testing the squareness of a piston in relation to the crank shaft bearing.

Fig. 4 is a plan view of the device.

Figure 1:
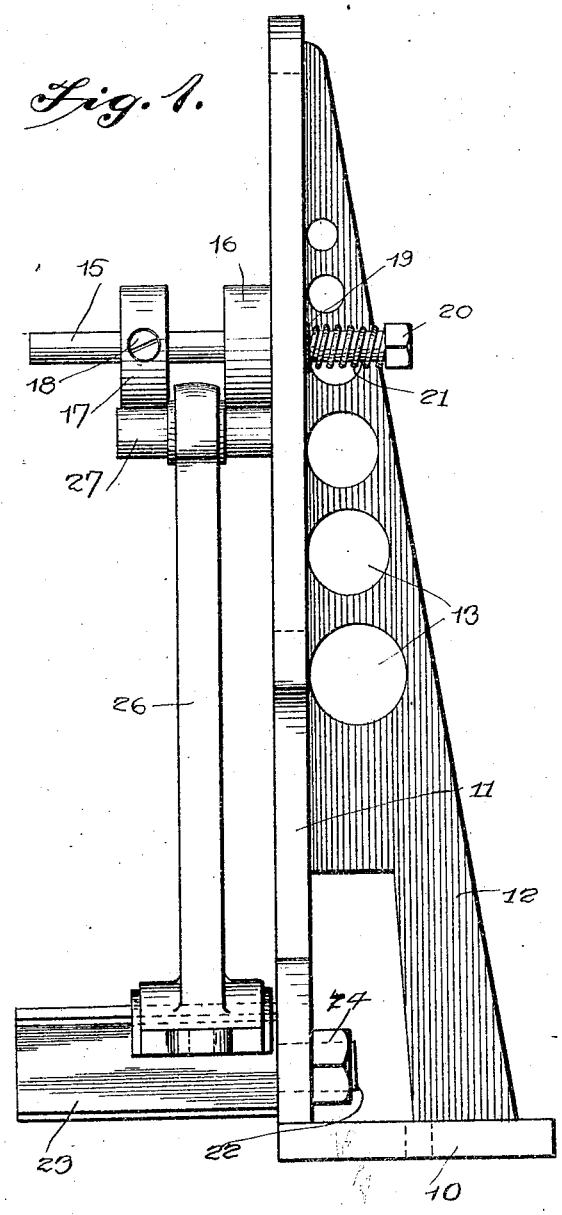
Fig. 1 is a side elevation of the invention showing it in use for testing the truth of the squareness of a piston pin in its relation to the bearing on the crank shaft.
Figure 2:
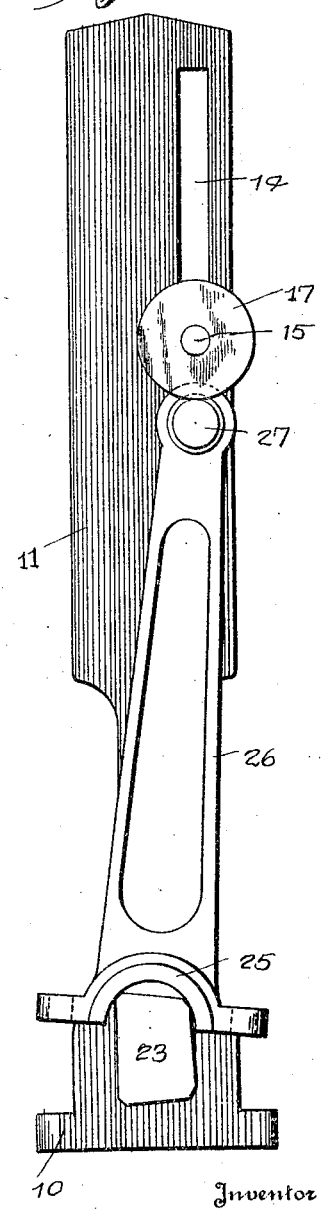
Fig. 2 is a face view thereof.

In the embodiment of the invention herein described, there is provided a bracket or standard having a base 10 and upright 11, the end face of the base and the working face of the upright being preferably at right angles to each other. These parts are connected by a rib 12, which is used for strengthening the parts and holding them in proper squared relation without making the device unduly heavy, this rib being provided with openings 13 for the purpose of lightening the same. It is to be observed that the portion 11 of the device is narrowed toward the bottom so that the lower end and the upper end are connected by a shank or narrow portion. This also serves to render the device lighter than would otherwise be the case if the same width was maintained throughout the height of the portion 11. At one side of the upper part of the leg 11 is provided a vertical slot 14 wherethrough passes the pin 15 which is provided with a pair of collars 16 and 17, the collar 16 being preferably permanently fixed to the pin, while the collar 17 is adjustable along the pin and is held in adjusted position by means of a set screw 18. On the end of the pin which passes through the slot 14, there is fitted a washer 19 which bears against the back face of the member 11 and surrounding the pin between this washer and an adjusting nut 20 is a coiled compression spring 21. Thus the pin is frictionally held in position on the upright 11 by engagement between the fixed collar 16 and the washer 19, the spring 21 being adjustable by means of the nut 20 to provide the required amount of friction. In the lower end of the upright 11 is a suitable opening for the reception of a shank 22 formed on a gauge block or rest 23 which projects forwardly from the front face of the member 11. This shank is threaded and receives the securing nut 24.

It will be noted that in cross section the rest 23 has no two sides parallel and that the edges are bevelled off so that by rotating the same different dimensions of crank shaft connecting rod bearings, such as are shown at 25 may rest on the support 23 and be rocked thereon. In the construction of the device especial attention is paid to having the dimensions of the disks 16 and 17 uniform and having the pins 15 and support 23 projecting exactly at right angles from the standard 11. Under these conditions, a connecting rod 26 having the pin 27 fitted therein may have its crank end placed on the support 23 and the pin brought into engagement, by proper adjustment of the pin 15, with the disks 16 and 17. Then if the pin is out of parallelism with the bearing 25 the indication will be promptly had. In like manner, as shown in Fig. 3, since the support 23 extends at right angles to the standard 11, a piston with its connecting rod such as is shown in dotted lines at 28 may be supported on the standard, and the side of the piston brought against the face of the standard. Under these conditions if the piston is not square to the crank bearing, the lack of truth will be quickly disclosed.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is wished to include all such as properly come within the scope claimed.

Having thus described the invention, what is claimed as new, is:

1. In a device of the kind described, a standard having an accurately formed plane face, a bearing rest projecting accurately at right angles to said face adjacent one end thereof, said standard having a slot therethrough and extending longitudinally thereof, a pin projecting through said slot, a collar on said pin having a face bearing against said standard face, the pin being accurately at right angles to the said collar face, a second collar slidable along the pin, said collars having their peripheral faces accurately concentric to said pin and the collars being of the same diameter, means to hold the second collar in adjusted position on the pin, and friction means to hold the first collar and pin in position of adjustment along said standard.

2. In a device of the kind described, a standard having an accurately formed plane face, a bearing rest projecting accurately at right angles to said face adjacent one end thereof, said standard having a slot therethrough and extending longitudinally thereof, a pin projecting through said slot, a collar on said pin having a face bearing against said standard face, the pin being accurately at right angles to the said collar face, a second collar slidable along the pin, said collars having their peripheral faces accurately concentric to said pin and the collars being of the same diameter, means to hold the second collar in adjusted position on the pin, friction means to hold the first collar and pin in position of adjustment along said standard, and comprising a washer bearing against the back of said standard, a coil spring surrounding the pin and bearing at one end against the washer, and a nut screwed on the pin and bearing against the remaining end of the coiled spring.

In testimony whereof we affix our signatures.

CHAS. F. GILFORD.
FRED. E. GILFORD.